US006993617B2

(12) United States Patent
Butcher et al.

(10) Patent No.: US 6,993,617 B2
(45) Date of Patent: Jan. 31, 2006

(54) SYSTEM-ON-A-CHIP HAVING AN ON-CHIP PROCESSOR AND AN ON-CHIP DYNAMIC RANDOM ACCESS MEMORY (DRAM)

(75) Inventors: Lawrence Butcher, Mountain View, CA (US); Duane Northcutt, Menlo Park, CA (US); Marc Schneider, San Jose, CA (US); Jerry Wall, San Jose, CA (US); James Hanko, Redwood City, CA (US); Alan Ruberg, Foster City, CA (US); Satyanarayana Simha, Sunnyvale, CA (US); Michael E. Duboce, Newark, CA (US); Arvind Srinivasan, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 249 days.

(21) Appl. No.: 10/393,865

(22) Filed: Mar. 21, 2003

(65) Prior Publication Data

US 2003/0208653 A1 Nov. 6, 2003

Related U.S. Application Data

(60) Provisional application No. 60/376,705, filed on May 1, 2002.

(51) Int. Cl.
*G06F 13/00* (2006.01)
*G06F 13/38* (2006.01)
*G06F 13/40* (2006.01)

(52) U.S. Cl. ...................... 710/305; 710/313; 710/315
(58) Field of Classification Search ............... 710/100, 710/305–306, 104, 105, 313
See application file for complete search history.

(56) References Cited

U.S. PATENT DOCUMENTS

| | | | | |
|---|---|---|---|---|
| 5,687,131 A | * | 11/1997 | Spaderna | 365/230.01 |
| 5,883,814 A | * | 3/1999 | Luk et al. | 716/2 |
| 5,987,556 A | * | 11/1999 | Nakagawa et al. | 710/305 |
| 6,262,594 B1 | * | 7/2001 | Cheung et al. | 326/38 |
| 6,353,867 B1 | * | 3/2002 | Qureshi et al. | 710/305 |
| 6,467,009 B1 | * | 10/2002 | Winegarden et al. | 710/305 |
| 6,526,462 B1 | * | 2/2003 | Elabd | 710/242 |
| 2002/0073351 A1 | * | 6/2002 | Oh | 713/500 |
| 2002/0108006 A1 | * | 8/2002 | Snyder | 710/100 |
| 2002/0144045 A1 | * | 10/2002 | Edara et al. | 710/305 |
| 2003/0018929 A1 | * | 1/2003 | Bardsley et al. | 714/39 |
| 2003/0097510 A1 | * | 5/2003 | Joseph | 710/305 |
| 2003/0110306 A1 | * | 6/2003 | Bailis et al. | 709/253 |

OTHER PUBLICATIONS

Bursky, Dave; "Set-Top Boxes Flex Their Muscles With Programmable Processors"; Electronic Design; Apr. 19, 1999; vol. 47, No. 8; available online at <"http://www.el-ecdesign.com/Globals/PlanetEE/Content/3146.html">.*

(Continued)

*Primary Examiner*—Paul R. Myers
*Assistant Examiner*—Ryan Stiglic
(74) *Attorney, Agent, or Firm*—Martine Penilla & Gencarella, LLP (57) ABSTRACT

A system-on-a-chip device is provided, the system-on-a-chip device comprising an on-chip processor and an on-chip dynamic random access memory (DRAM) capable of communicating with the on-chip processor. The system-on-a-chip device also comprises at least one on-chip input/output (I/O) bus capable of communicating with the on-chip processor and the on-chip dynamic random access memory (DRAM).

2 Claims, 8 Drawing Sheets

OTHER PUBLICATIONS

Rincon et al.; "The Changing Landscape of System-on-a-Chip Design"; IEEE; IEEE 1999 Custom Integrated Circuits Conference; pp. 83-90.*

SPARC International Inc.; "The SPARC Architecture Manual"; Version 8; SPARC International Inc.; 1992; pp. 1-4.*

* cited by examiner

SYSTEM-ON-A-CHIP HAVING AN ON-CHIP PROCESSOR AND AN ON-CHIP DYNAMIC RANDOM ACCESS MEMORY (DRAM)

RELATED APPLICATION DATA

This patent application claims priority pursuant to 35 U.S.C. §119(e) to U.S. provisional patent application Ser. No. 60/376,705, filed May 1, 2002, for SYSTEM-ON-A-CHIP HAVING AN ON-CHIP PROCESSOR AND AN ON-CHIP DYNAMIC RANDOM ACCESS MEMORY (DRAM).

BACKGROUND OF THE INVENTION

1. Field of the Invention

This invention relates generally to computer hardware and, more particularly, to a device combining a processor, a dynamic random access memory (DRAM) and an input/output (I/O) bus in a system-on-a-chip.

2. Description of the Related Art

There is a constant drive within the semiconductor industry to increase the operating speed of integrated circuit devices, e.g., microprocessors, memory devices, and the like. This drive is fueled by consumer demands for computers and electronic devices that operate at increasingly greater speeds. This demand for increased speed has resulted in a continual reduction in the size of semiconductor devices, e.g., transistors, as well as a continual reduction in the lengths of the interconnections connecting the semiconductor devices that comprise the integrated circuit devices. Thus, there is a constant drive to reduce the size, or scale, of the components and/or the interconnection lengths of atypical integrated circuit device to increase the overall speed of the integrated circuit device, as well as devices incorporating such integrated circuit devices.

However, the incorporation of many different components, such as a processor and an input/output (I/O) bus and the like onto a single chip, to provide a reduction in the interconnection lengths connecting these various components, has been frustrated by the inability to provide adequate memory storage capacity onto the same chip. For example, conventional integrated circuit devices typically provide a dynamic random access memory (DRAM) chip separate and apart from the chip having the processor thereon. This leads to an increase in the interconnection lengths connecting the processor and the dynamic random access memory (DRAM) and decreases the overall speed of the conventional integrated circuit device.

The present invention is directed to overcoming, or at least reducing the effects of, one or more of the problems set forth above.

SUMMARY OF THE INVENTION

In one aspect of the present invention, a system-on-a-chip device is provided, the system-on-a-chip device comprising an on-chip processor and an on-chip dynamic random access memory (DRAM) capable of communicating with the on-chip processor. The system-on-a-chip device also comprises at least one on-chip input/output (I/O) bus capable of communicating with the on-chip processor and the on-chip dynamic random access memory (DRAM).

In another aspect of the present invention, a system-on-a-chip method is provided, the system-on-a-chip method comprising providing an on-chip processor and providing an on-chip dynamic random access memory (DRAM) capable of communicating with the on-chip processor. The system-on-a-chip method also comprises providing at least one on-chip input/output (I/O) bus capable of communicating with the on-chip processor and the on-chip dynamic random access memory (DRAM).

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
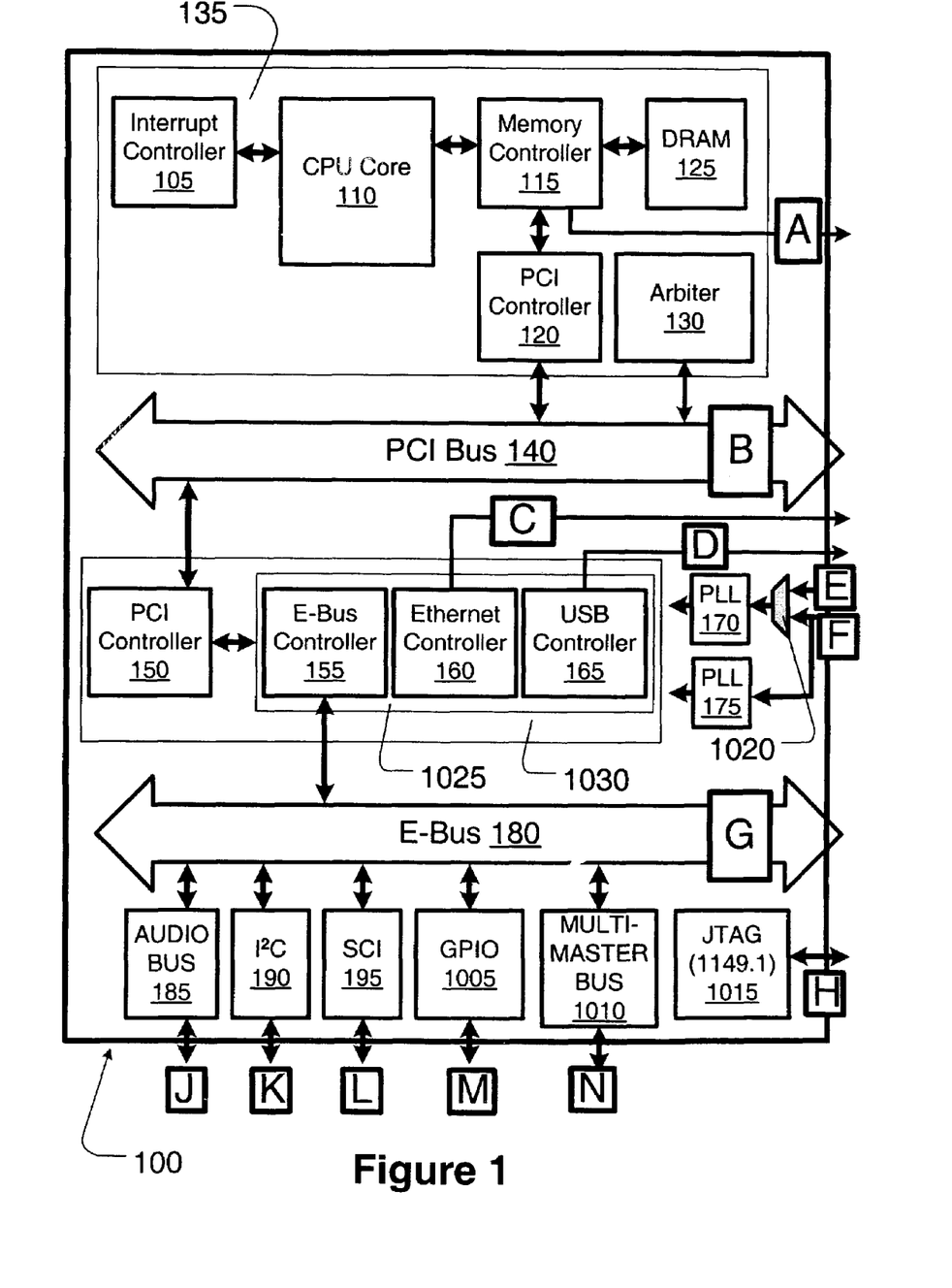
FIG. 1 schematically illustrates a system-on-a-chip device in accordance with various exemplary embodiments of the present invention.

Illustrative embodiments of a method and a device according to the present invention are shown in FIGS. 1–20. As shown in FIG. 1, in various illustrative embodiments of the present invention, a system-on-a-chip device 100 is provided, the system-on-a-chip device 100 comprising an on-chip processor 110, an on-chip dynamic random access memory (DRAM) 125 and at least one on-chip input/output (I/O) bus 140. In one embodiment, the on-chip processor 110 may comprise a central processing unit (CPU) core 110 having an architecture capable of executing one or more instruction sets. For example, the CPU core 110 may have a V8 architecture capable of executing the Sparc V8 instruction set. For another example, the CPU core 110 may have a V9 architecture capable of executing the Sparc V9 instruction set.

Figure 3:
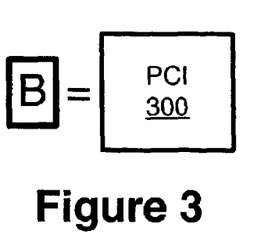

The on-chip dynamic random access memory (DRAM) 125 may be an embedded dynamic random access memory (eDRAM) having about 4 megabytes (4 MB) of embedded dynamic random access memory (eDRAM). The on-chip input/output (I/O) bus 140 may be a peripheral component interconnect (PCI) bus 140, connected, as shown in FIG. 3, to a peripheral component interconnect (PCI) 300, as indicated by the box labeled B in FIGS. 1 and 3.

Figure 2:
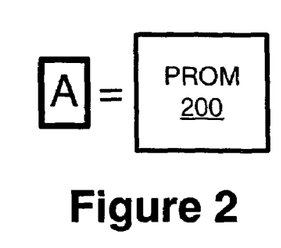
FIGS. 2–14 schematically illustrate various off-chip connections for respective on-chip components shown in FIG. 1.

The system-on-a-chip device 100 may further comprise an on-chip memory controller 115. The on-chip memory controller 115 may be capable of communicating with the on-chip processor 110 and the on-chip dynamic random access memory (DRAM) 125, as indicated by the double arrows in FIG. 1 connecting the on-chip memory controller 115, the on-chip processor 110 and the on-chip dynamic random access memory (DRAM) 125. The on-chip memory controller 115 may enable the on-chip dynamic random access memory (DRAM) 125 to be capable of communicating with the on-chip processor 110. The on-chip memory controller 115 may be connected, as shown in FIG. 2, to a programmable read only memory (PROM) device 200, as indicated by the box labeled A in FIGS. 1 and 2.

The system-on-a-chip device 100 may further comprise an on-chip peripheral component interconnect (PCI) controller 120. The on-chip peripheral component interconnect (PCI) controller 120 may be used to talk both on-chip and off-chip. The on-chip peripheral component interconnect (PCI) controller 120 may be capable of communicating with the on-chip memory controller 115 and the on-chip input/output (I/O) bus 140, as indicated by the double arrows in FIG. 1 connecting the on-chip peripheral component interconnect (PCI) controller 120, the on-chip memory controller 115 and the on-chip input/output (I/O) bus 140. The on-chip peripheral component interconnect (PCI) controller 120 may enable the on-chip dynamic random access memory (DRAM) 125 and/or the on-chip processor 110 to be capable of communicating with the on-chip input/output (I/O) bus 140 by way of the on-chip memory controller 115. The on-chip input/output (I/O) bus 140 may be connected, as shown in FIG. 3, to a peripheral component interconnect (PCI) device 300, as indicated by the box labeled B in FIGS. 1 and 3.

The system-on-a-chip device 100 may further comprise an on-chip interrupt controller 105. The on-chip interrupt controller 105 may be capable of communicating with the on-chip processor 110, as indicated by the double arrows in FIG. 1 connecting the on-chip interrupt controller 105 and the on-chip processor 110.

The system-on-a-chip device 100 may further comprise an on-chip arbiter 130. The on-chip arbiter 130 may be capable of communicating with the on-chip input/output (I/O) bus 140, as indicated by the double arrows in FIG. 1 connecting the on-chip arbiter 130 and the on-chip input/output (I/O) bus 140.

In various illustrative embodiments, the system-on-a-chip device 100 may comprise a microSPARC IIep device 135. The microSPARC IIep device 135 may comprise the on-chip processor 110, the on-chip dynamic random access memory (DRAM) 125, the on-chip memory controller 115, the on-chip peripheral component interconnect (PCI) controller 120, the on-chip interrupt controller 105 and the on-chip arbiter 130.

Figure 6:
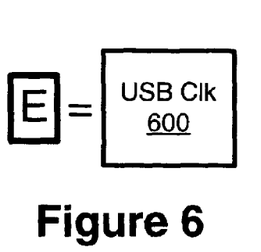
Figure 7:
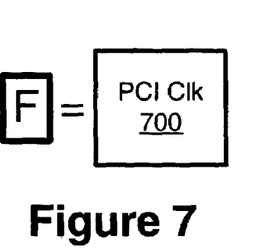

The system-on-a-chip device 100 may further comprise a first phase-lock loop (PLL) clock generator 170 capable of sending a signal to the on-chip processor 110 and a second phase-lock loop (PLL) clock generator 175 capable of sending a signal to the on-chip peripheral component interconnect (PCI) controller 120. The first phase-lock loop (PLL) clock generator 170 may receive a signal from a multiplexer 1020. The multiplexer 1020, in turn, may receive a signal, as shown in FIG. 6, from a universal serial bus (USB) clock (USB Clk) 600, as indicated by the box labeled E in FIGS. 1 and 6. The multiplexer 1020 may also receive a signal, as shown in FIG. 7, from a peripheral component interconnect clock (PCI Clk) 700, as indicated by the box labeled F in FIGS. 1 and 7. The first phase-lock loop (PLL) clock generator 170 may send a signal to the on-chip processor 110, to a central processing unit (CPU) clock, for example, as indicated by the arrow pointing away from the first phase-lock loop (PLL) clock generator 170.

The second phase-lock loop (PLL) clock generator 175 may also receive a signal, as shown in FIG. 7, from the peripheral component interconnect clock (PCI Clk) 700, as indicated by the box labeled F in FIGS. 1 and 7. The second phase-lock loop (PLL) clock generator 175 may send a signal to the on-chip peripheral component interconnect (PCI) controller 120, to an on-chip peripheral component interconnect (PCI) clock, for example, as indicated by the arrow pointing away from the second phase-lock loop (PLL) clock generator 175.

Figure 8:
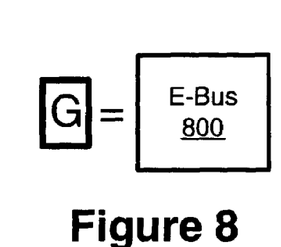

In various illustrative embodiments, the system-on-a-chip device 100 may comprise an on-chip expansion bus (E-Bus) input/output (I/O) bus 180 capable of communicating with an on-chip expansion bus (E-Bus) controller 155, as indicated by the double arrows in FIG. 1 connecting the on-chip expansion bus (E-Bus) input/output (I/O) bus 180 and the on-chip expansion bus (E-Bus) controller 155. The on-chip expansion bus (E-Bus) input/output (I/O) bus 180 may be connected, as shown in FIG. 8, to an off-chip expansion bus industry standard architecture (E-Bus/ISA) interface device 800, as indicated by the box labeled G in FIGS. 1 and 8.

Figure 4:
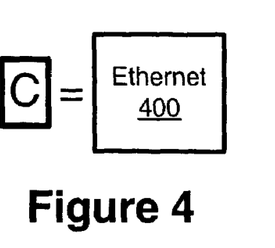

The system-on-a-chip device 100 may further comprise an on-chip Ethernet controller 160. The on-chip Ethernet controller 160 may be connected, as shown in FIG. 4, to an Ethernet device 400, as indicated by the box labeled C in FIGS. 1 and 4.

Figure 5:
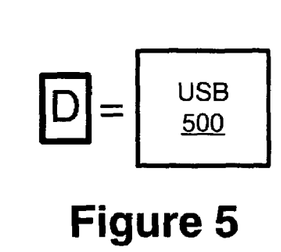

The system-on-a-chip device 100 may further comprise an on-chip universal serial bus (USB) Host controller 165. The on-chip USB Host controller 16 may be connected, as shown in FIG. 5, to a universal serial bus (USB) device 500, as indicated by the box labeled D in FIGS. 1 and 5.

In various illustrative embodiments, the system-on-a-chip device 100 may comprise an on-chip external controller device 1025. The on-chip external controller device 1025 may comprise the on-chip expansion bus (E-Bus) controller 155, the on-chip Ethernet controller 160 and the on-chip universal serial bus (USB) Host controller 165.

The system-on-a-chip device 100 may further comprise an on-chip peripheral component interconnect (PCI) controller 150. The on-chip peripheral component interconnect (PCI) controller 150 may be capable of communicating with the on-chip external controller device 1025 and the on-chip peripheral component interconnect (PCI) input/output (I/O) bus 140, as indicated by the double arrows in FIG. 1 connecting the on-chip external controller device 1025, on-chip peripheral component interconnect (PCI) controller 150 and the on-chip peripheral component interconnect (PCI) input/output (I/O) bus 140.

In various illustrative embodiments, the system-on-a-chip device 100 may comprise an on-chip input/output core 1030. The on-chip Input/output core 1030 may comprise the on-chip peripheral component interconnect (PCI) controller 150 and the on-chip external controller device 1025.

Figure 9:
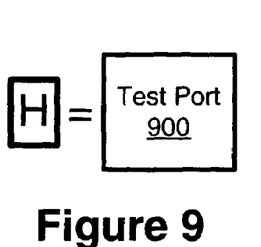

The system-on-a-chip device 100 may further comprise an on-chip Joint Test Access Group (JTAG) device 1015. The on-chip JTAG device 1015 may be connected, as shown in FIG. 9, to a Test Port 900, as indicated by the box labeled H in FIGS. 1 and 9. The on-chip joint test access group (JTAG) device 1015 may operate according to the 1149.1 standard.

Figure 10:
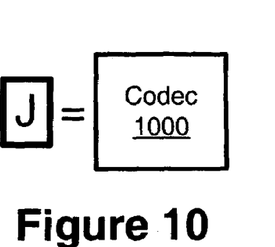

The system-on-a-chip device 100 may further comprise an on-chip audio bus interface 185 that may be capable of communicating with the on-chip expansion bus (E-Bus) input/output (I/O) bus 180. For example, the on-chip audio bus interface 185 may be an on-chip Intel® AC97. The on-chip audio bus interface 185 may be connected, as shown in FIG. 10, to a coder/decoder (Codec) 1000, as indicated by the box labeled J in FIGS. 1 and 10.

Figure 11:
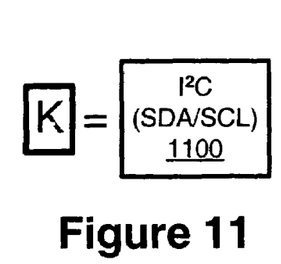

The system-on-a-chip device 100 may further comprise an on-chip multi-master bus 190. For example, the multi-master bus 190 may be an Inter-IC (I²C) universal asynchronous receiver/transmitter (UART). The on-chip multi-master bus 190 may be capable of communicating with the on-chip expansion bus (E-Bus) input/output (I/O) bus 180. The on-chip multi-master bus 190 may be connected, as shown in FIG. 11, to an I²C 2-wire serial data and serial clock bus (I²C SDA/SCL) 1100, as indicated by the box labeled K in FIGS. 1 and 11.

Figure 12:
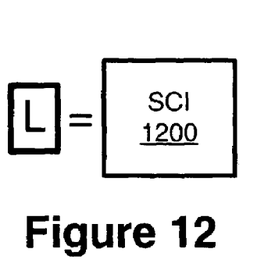

The system-on-a-chip device 100 may further comprise an on-chip Smart Card Interface (SCI) universal asynchronous receiver/transmitter (UART) 195. The on-chip Smart Card Interface (SCI) universal asynchronous receiver/transmitter (UART) 195 may be capable of communicating with the on-chip expansion bus (E-Bus) input/output (I/O) bus 180. The on-chip Smart Card Interface (SCI) universal asynchronous receiver/transmitter (UART) 195 may be connected, as shown in FIG. 12, to a Smart Card Interface (SCI) device 1200, as indicated by the box labeled L in FIGS. 1 and 12.

Figure 13:
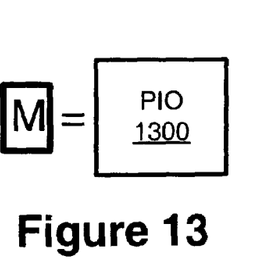

The system-on-a-chip device 100 may further comprise an on-chip general purpose input/output interface (GPIO) 1005. The on-chip GPIO 1005 may be capable of communicating with the on-chip expansion bus (E-Bus) input/output (I/O) bus 180. The on-chip GPIO 1005 may be connected, as shown in FIG. 13, to a parallel input/output device (PIO) 1300, as indicated by the box labeled M in FIGS. 1 and 13.

Figure 14:
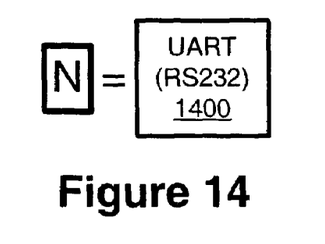

The system-on-a-chip device 100 may further comprise an on-chip universal asynchronous receiver/transmitter 16550A (UART 16550A) 110. The on-chip universal asynchronous receiver/transmitter 16550A (UART 16550A) 1010 may be capable of communicating with the on-chip expansion bus (E-Bus) input/output (I/O) bus 180. The on-chip universal asynchronous receiver/transmitter 16550A (UART 16550A) 1010 may be connected, as shown in FIG. 14, to a universal asynchronous receiver/transmitter RS232 (UART RS232) device 1400, as indicated by the box labeled N in FIGS. 1 and 14.

The system-on-a-chip device 100 may further comprise an on-chip private flash bus capable of latching configuration options at power-up. For example, the on-chip memory controller 115 may be connected, as shown in FIG. 2, to the programmable read only memory (PROM) device 200, as indicated by the box labeled A in FIGS. 1 and 2.

FIGS. 15–20 schematically illustrate particular embodiments of respective methods 1500–2000 practiced in accordance with the present invention. FIGS. 1–14 schematically illustrate various exemplary particular embodiments with which the methods 1500–2000 may be practiced. For the sake of clarity, and to further an understanding of the invention, the methods 1500–2000 shall be disclosed in the context of the various exemplary particular embodiments shown in FIGS. 1–14. However, the present invention is not so limited and admits wide variation, as is discussed further below.

Figure 15:
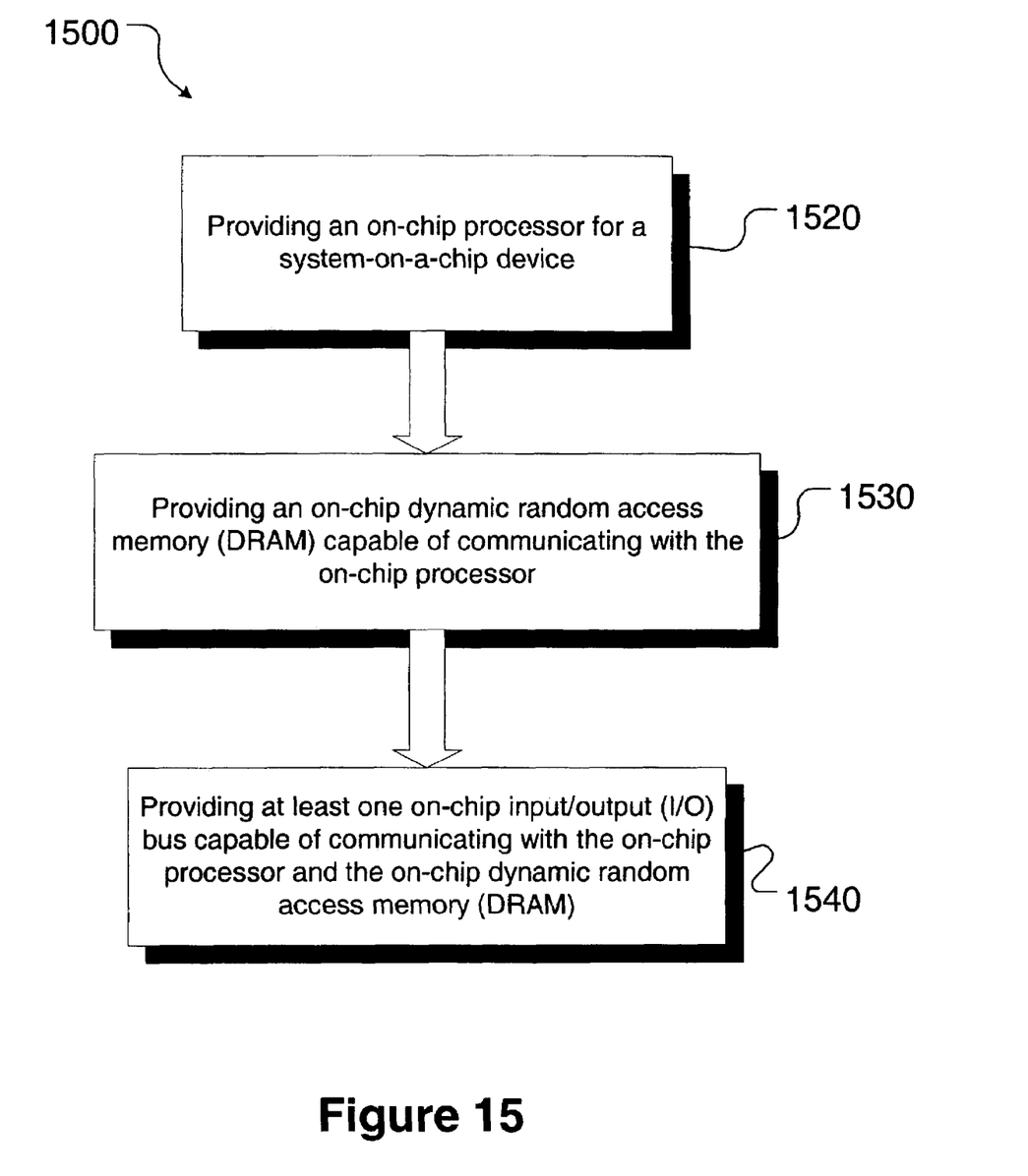
FIGS. 15–20 schematically illustrate various embodiments of a system-on-a-chip method according to the present invention.
Figure 20:
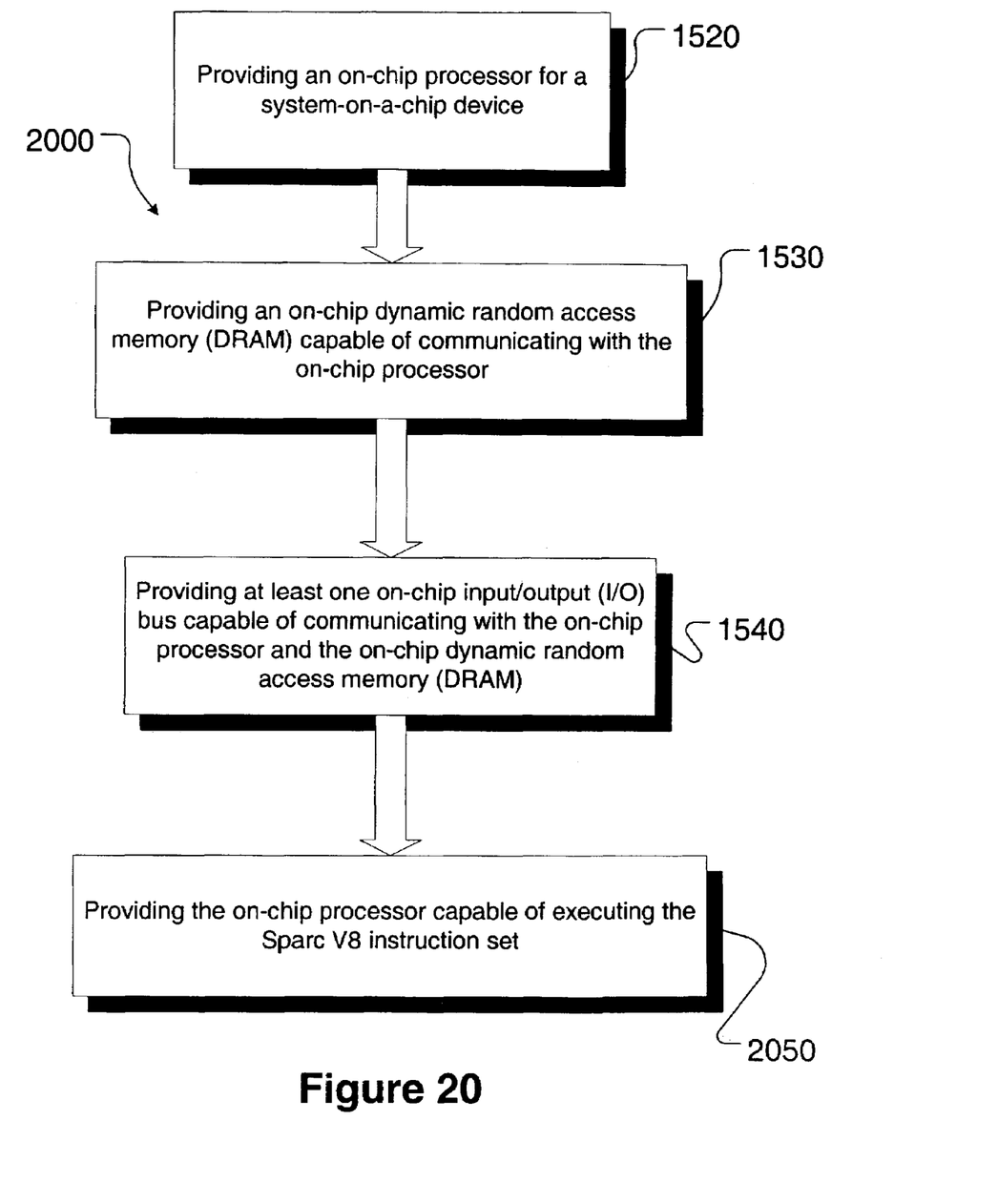

As shown in FIG. 15, the method 1500 begins, as set forth in box 1520, by providing an on-chip processor for a system-on-a-chip device. For example, as shown in FIG. 1, the on-chip processor 110 may be provided for the system-on-a-chip device 100. In various illustrative embodiments, and as set forth in box 2050 of method 2000, the on-chip processor 110 may be provided comprising a central processing unit (CPU) core 110 having a V8 architecture capable of executing the Sparc V8 instruction set. It will be appreciated, however, that the present invention is not so limited. In alternative embodiments, the central processing unit (CPU) core 110 may have a V9 architecture capable of executing the Sparc V9 instruction set.

The method 1500 proceeds by providing an on-chip dynamic random access memory (DRAM) capable of communicating with the on-chip processor, as set forth in box 1530. For example, as shown in FIG. 1, the on-chip dynamic random access memory (DRAM) 125 may be provided and may comprise an embedded dynamic random access memory (eDRAM) having about 4 megabytes (4 MB) of embedded dynamic random access memory (eDRAM). The on-chip input/output (I/O) bus 140 may be a peripheral component interconnect (PCI) bus 140.

The method 1500 then proceeds, as set forth in box 1540, by providing at least one on-chip input/output (I/O) bus capable of communicating with the on-chip processor and the on-chip dynamic random access memory (DRAM). For example, as shown in FIG. 1, the on-chip input/output (I/O) bus 140 may be provided and may comprise a peripheral component interconnect (PCI) bus 140.

Figure 16:
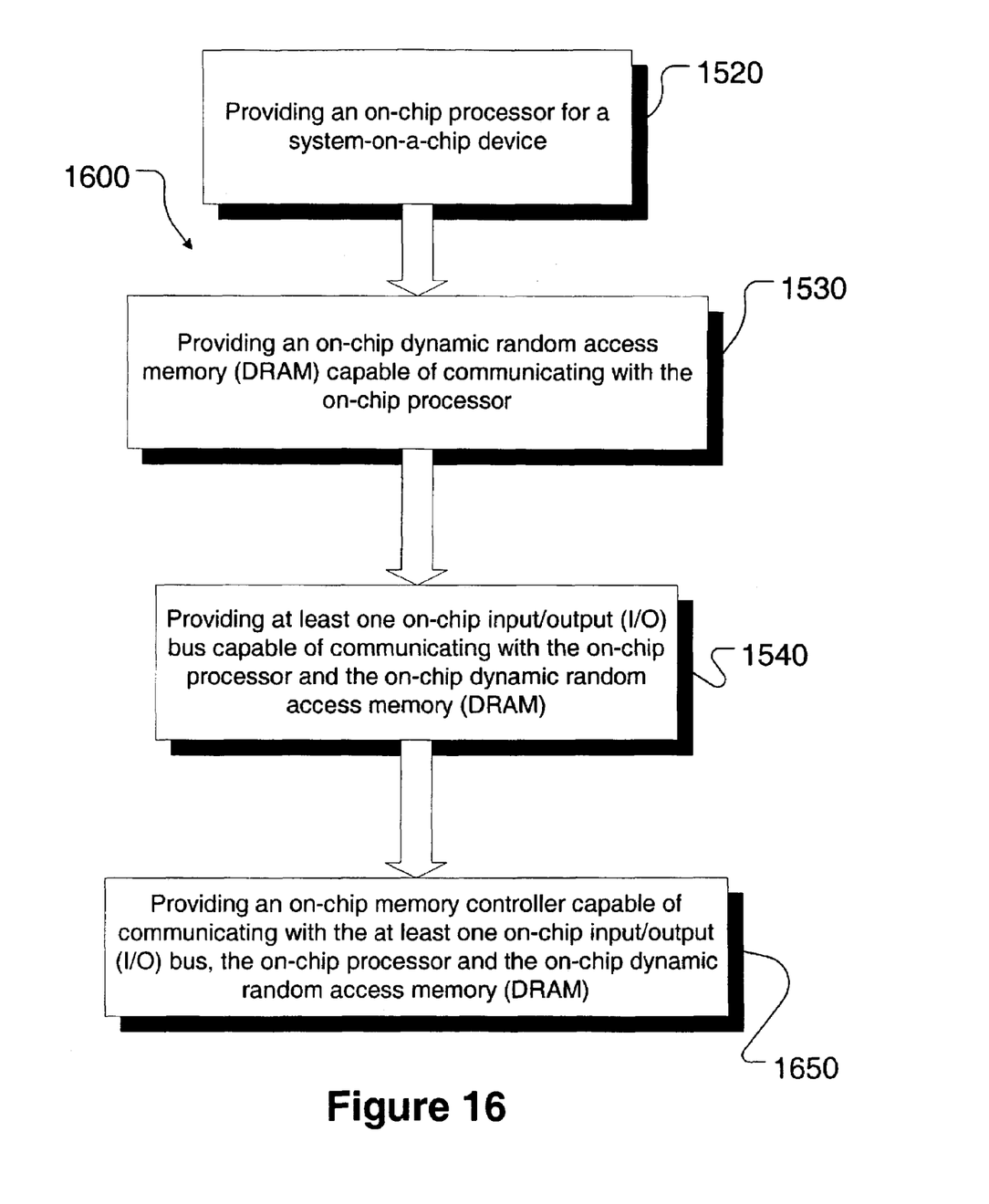

In various illustrative embodiments, as shown in FIG. 16, and as set forth in box 1650 of method 1600, an on-chip memory controller may be provided and may be capable of communicating with the at least one on-chip input/output (I/O) bus, the on-chip processor and the on-chip dynamic random access memory (DRAM). For example, as shown in FIG. 1, the on-chip memory controller 115 may be provided and may be capable of communicating with the on-chip processor 110 and the on-chip dynamic random access memory (DRAM) 125, as indicated by the double arrows in FIG. 1. The on-chip memory controller 115 may enable the on-chip dynamic random access memory (DRAM) 125 to be capable of communicating with the on-chip processor 110. The on-chip peripheral component interconnect (PCI) controller 120 may enable the on-chip dynamic random access memory (DRAM) 125 and/or the on-chip processor 110 to be capable of communicating with the on-chip input/output (I/O) bus 140 by way of the on-chip memory controller 115.

The system-on-a-chip device 100 may further comprise an on-chip peripheral component interconnect (PCI) controller 120. The on-chip input/output (I/O) bus 140 may be connected, as shown in FIG. 3, to a peripheral component interconnect (PCI) device 300, as indicated by the box labeled B in FIGS. 1 and 3.

Figure 17:
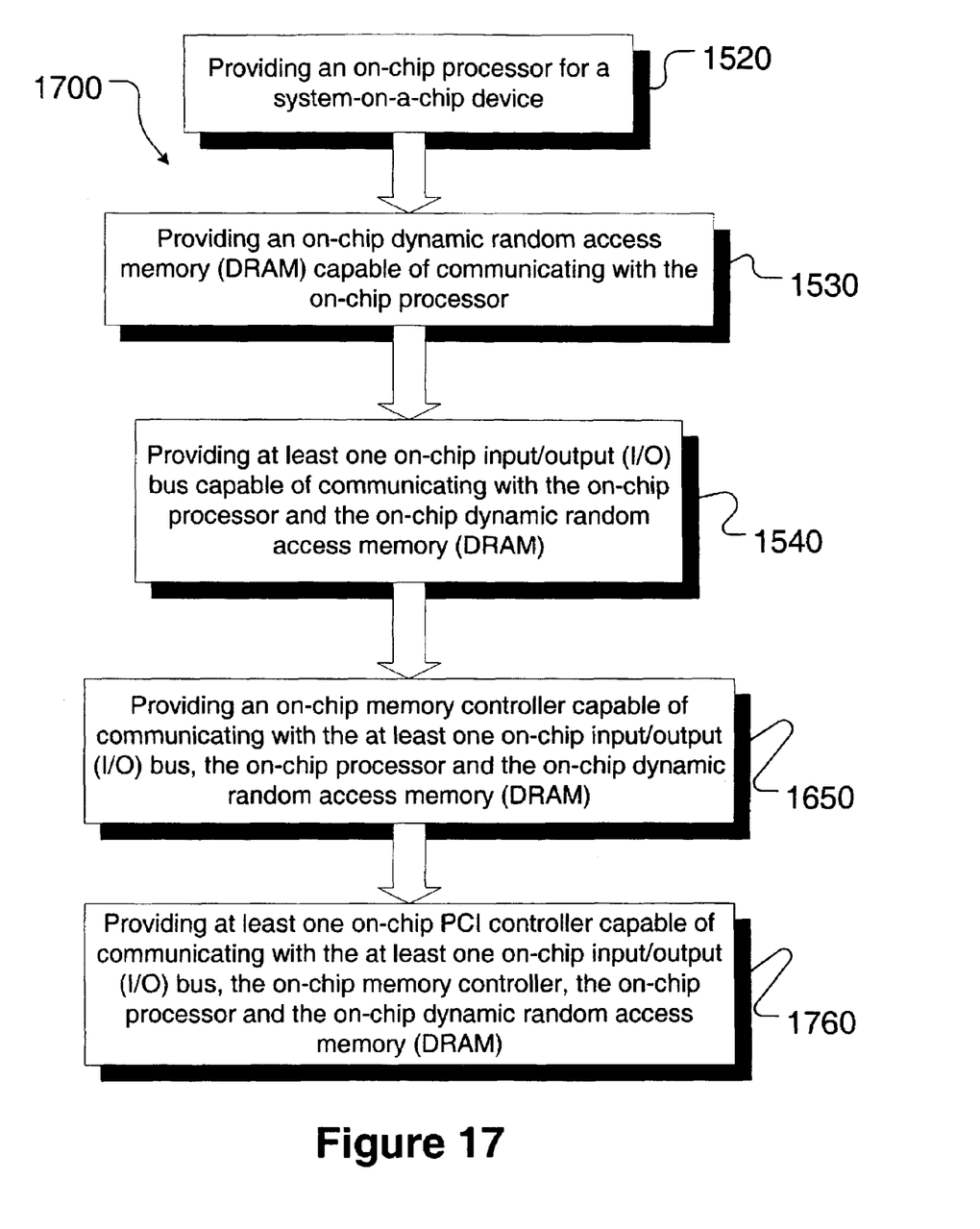

In various alternative illustrative embodiments, as shown in FIG. 17, and as set forth in box 1760 of method 1700, at least one on-chip peripheral component interconnect (PCI) controller may be provided and may be capable of communicating with the at least one on-chip input/output (I/O) bus, the on-chip memory controller, the on-chip processor and the on-chip dynamic random access memory (DRAM). For example, the on-chip peripheral component interconnect (PCI) controller 120 may be used to talk both on-chip and off-chip. The on-chip peripheral component interconnect (PCI) controller 120 may be capable of communicating with the on-chip memory controller 115 and the on-chip input/output (I/O) bus 140, as indicated by the double arrows in FIG. 1. The on-chip peripheral component interconnect (PCI) controller 120 may enable the on-chip dynamic random access memory (DRAM) 125 and/or the on-chip processor 110 to be capable of communicating with the on-chip input/output (I/O) bus 140 by way of the on-chip memory controller 115.

Figure 18:
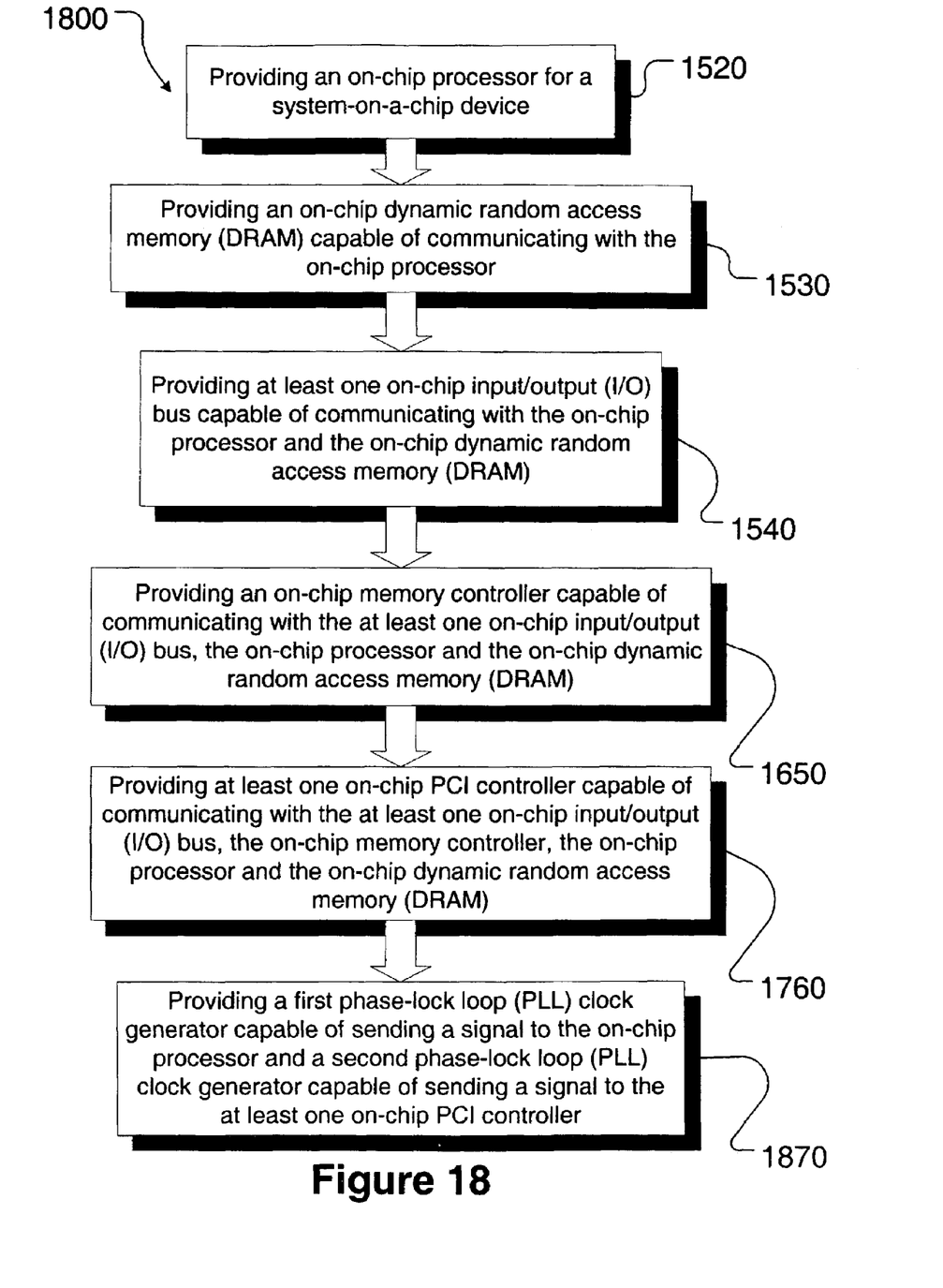

In various other alternative illustrative embodiments, as shown in FIG. 18, and as set forth in box 1870 of method 1800, a first phase-lock loop (PLL) clock generator may be provided and may be capable of sending a signal to the on-chip processor and a second phase-lock loop (PLL) clock generator may be provided and may be capable of sending a signal to the at least one on-chip peripheral component interconnect (PCI) controller. For example, as shown in FIG. 1, a first phase-lock loop (PLL) clock generator 170 may be provided and may be capable of sending a signal to the on-chip processor 110 and a second phase-lock loop (PLL) clock generator 175 may be provided and may be capable of sending a signal to the on-chip peripheral component interconnect (PCI) controller 120.

Figure 19:
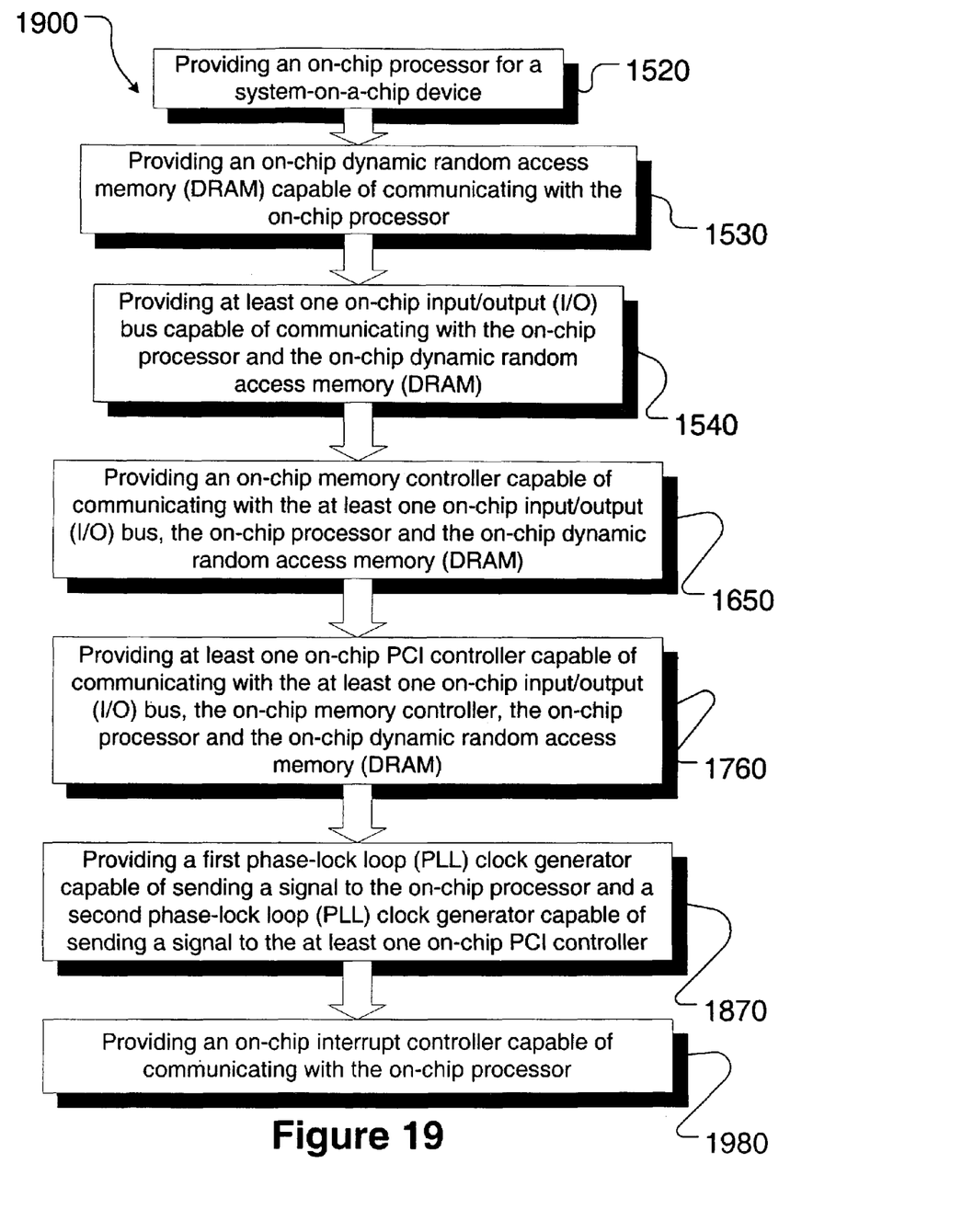

In yet other various alternative illustrative embodiments, as shown in FIG. 19, and as set forth in box 1980 of method 1900, an on-chip interrupt controller may be provided and may be capable of communicating with the on-chip processor. For example, as shown in FIG. 1, the on-chip interrupt controller 105 may be provided and may be capable of communicating with the on-chip processor 110.

Any of the above-disclosed embodiments of a method and a device according to the present invention enables a dynamic random access memory (DRAM) device and a processor to be disposed on the same chip. This leads to a decrease in the interconnection lengths connecting the processor and the dynamic random access memory (DRAM) and increases the overall speed of an integrated circuit device comprising the processor and the dynamic random access memory (DRAM).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b", or, equivalently, "from approximately a to b," or, equivalently, "from approximately a–b") disclosed herein is to be understood as referring to the power set (the set of all subsets) of the respective range of values, in the sense of Georg Cantor. Accordingly, the protection sought herein is as set forth in the claims below.

What is claimed:

1. A system-on-a-chip device consisting of:
   an on-chip processor;
   an on-chip dynamic random access memory (DRAM) capable of communicating with the on-chip processor;
   an on-chip peripheral component interconnect (PCI) input/output (I/O) bus capable of communicating with the on-chip processor and the on-chip dynamic random access memory (DRAM);
   an on-chip arbiter capable of communicating with the component interconnect (PCI) input/output (I/O) bus;
   an on-chip expansion bus (E-bus) input/output (I/O) bus;
   an on-chip expansion bus (E-bus) controller capable of communicating with the on-chip expansion bus (E-bus) input/output (I/O) bus;
   an on-chip Ethernet controller;
   an on-chip universal serial bus Host controller;
   an on-chip universal asynchronous receiver/transmitter (UART) capable of communicating with the on-chip expansion bus (E-bus) input/output (I/O) bus;
   an on-chip Smart Card Interface (SCI) universal asynchronous receiver/transmitter (UART) capable of communicating with the on-chip expansion bus (E-bus) input/output (I/O) bus;
   an on-chip I$^2$C universal asynchronous receiver/transmitter (UART) capable of communicating with the on-chip expansion bus (E-bus) input/output (I/O) bus;
   an on-chip GPIO capable of communicating with the on-chip expansion bus (E-bus) input/output (I/O) bus;
   an on-chip joint test access group (JTAG) device;
   an on-chip AC97 interface capable of communicating with the on-chip expansion bus (E-bus) input/output (I/O) bus;
   an on-chip private flash bus capable of latching configuration options at power-up;
   a first on-chip peripheral component interconnect (PCI) controller capable of communicating with the on-chip peripheral component interconnect (PCI) input/output (I/O) bus, the on-chip memory controller, the on-chip processor, and the on-chip dynamic random access memory (DRAM);
   a second on-chip peripheral component interconnect (PCI) controller capable of communicating with the on-chip peripheral component interconnect (PCI) input/output (I/O) bus, the on-chip E-bus controller, the on-chip Ethernet controller, and the on-chip USB Host controller;
   a first on-chip phase-lock loop (PLL) clock generator capable of sending a signal to the on-chip processor; an
   a second on-chip phase-lock loop(PLL) clock generator capable of sending a signal to the at least one on-chip peripheral component interconnect (PCI) controller.

2. A system-on-a-chip device consisting of:
   an on-chip processor consisting of a central processing unit core consisting of one of a V8 or V9 architecture capable of executing a respective V8 or V9 Sparc instruction set, the architecture having a central processing unit clock;
   an on-chip dynamic random access memory capable of communicating with the on-chip processor;
   at least one on-chip input/output bus capable of communicating with the on-chip processor and the on-chip dynamic random access memory, the on-chip input/output bus consisting of a peripheral component interconnect bus;
   an on-chip memory controller capable of communicating with the on-chip processor, the on-chip dynamic random access memory, and the at least one on-chip input/output bus;
   an on-chip peripheral component interconnect capable of communicating with the peripheral component interconnect bus, the on-chip peripheral component interconnect having an on-chip peripheral component interconnect clock;
   an on-chip peripheral component interconnect controller capable of communicating on-chip and off-chip, the on-chip peripheral component interconnect controller being capable of communicating with the on-chip memory controller and the at least one on-chip input/output bus and with the on-chip dynamic random access memory via the on-chip memory controller;
   an on-chip interrupt controller capable of communicating with the on-chip processor;
   an on-chip arbiter capable of communicating with the on-chip input/output bus;
   a microSPARC IIep device consisting of the on-chip processor, the on-chip dynamic random access memory, the on-chip memory controller, the on-chip peripheral component interconnect controller, the on-chip interrupt controller, and the on-chip arbiter;

a first on-chip phase-lock loop clock generator capable of sending a signal to the central processing unit clock of the on-chip processor;

a second on-chip phase-lock loop clock generator capable of sending a signal to the on-chip peripheral component interconnect controller to the on-chip peripheral component interconnect clock;

an on-chip expansion bus input/output bus;

an on-chip expansion bus input/output bus controller capable of communicating with the on-chip expansion bus input/output bus;

an on-chip Ethernet controller;

an on-chip universal serial bus Host controller;

an on-chip external controller device consisting of the on-chip expansion bus input/output bus controller, the on-chip Ethernet controller, and the on-chip universal serial bus Host controller;

an on-chip peripheral component controller capable of communicating with the on-chip external controller device and the on-chip peripheral component interconnect bus;

an on-chip input/output core consisting of the on-chip peripheral component controller and the on-chip external controller device;

an on-chip Joint Test Access group device;

an on-chip audio bus interface capable of communicating with the on-chip expansion bus input/output bus, the on-chip audio bus interface consisting of an Intel AC97;

an on-chip multi-master bus consisting of an Intel-IV universal asynchronous receiver/transmitter capable of communicating with the on-chip expansion bus input/output bus;

an on-chip Smart Card Interface universal asynchronous receiver/transmitter capable of communicating with the on-chip expansion bus input/output bus;

an on-chip general purpose input/output interface capable of communicating with the on-chip expansion bus input/output bus;

an on-chip universal asynchronous receiver/transmitter capable of communicating with the on-chip expansion bus input/output bus; and an on-chip private flash bus capable of latching configurations at power up.

* * * * *